Patented Aug. 14, 1923.

1,464,991

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM FLUORIDE.

No Drawing.    Application filed June 27, 1922. Serial No. 571,295.

*To all whom it may concern:*

Be it known that I, HENRY HOWARD, a citizen of the United States, residing at Cleveland, in the county of Cuyahoga and State of Ohio, have invented certain new and useful Improvements in Processes of Making Sodium Fluoride, of which the following is a specification.

This invention relates to a process of making sodium fluoride.

A known process of making sodium fluoride consists in neutralizing hydrofluoric acid with sodium carbonate and recovering the sodium fluoride formed by crystallization. This process is simple and works satisfactorily but since sodium carbonate is somewhat expensive and no valuable by-products are formed the cost of sodium fluoride produced by this method is high.

An object of my invention is the production of sodium fluoride from salts of sodium other than sodium carbonate such as the sodium salts of strong mineral acids, some of which like sodium chlorid and sodium sulfate are less expensive than sodium carbonate. A further object of the invention is the recovery of by-products which in part offset the cost of producing the sodium fluoride. Further objects of the invention are a simple process and the production of economical yields of sodium fluoride.

In an application entitled "Manufacture of sodium fluoride" filed March 1, 1922, Serial Number 540,306, I have described the manufacture of sodium fluoride from sodium chlorid, said process comprising essentially reacting upon sodium chlorid with hydrofluoric acid in the presence of an agent, such as ammonia, capable of neutralizing the hydrochloric acid generated in the reaction.

I have now found that the process described in said application may be applied to other sodium salts for the manufacture of sodium fluoride. The salts preferably employed are the inexpensive salts such as sodium chlorid, sodium nitrate and sodium sulfate. It is noted however that when the process is applied to sodium sulfate the double salt $2NaF.Na_2SO_4$ is the principal direct product of the process. The invention of course is not limited to the use of inexpensive salts. Sodium bromid and sodium iodid may be used if desired. The principal by-product of the process, that is, the salt formed by the interaction of the acid generated in the reaction with the neutralizing agent may be a controlling factor in the choice of the sodium salt used. It is also apparent that the fluoride of any metal may be made by this process provided such fluoride is less soluble than the metal salt employed as the starting material.

If it is attempted to simply substitute sodium chlorid for the sodium carbonate of the above mentioned usual process of making sodium fluoride as follows: $NaCl+HF=NaF+HCl$ the yield of sodium fluoride is not good probably due to the effect of the hydrochloric acid upon the reaction equilibrium. I have found that if the hydrochloric acid is neutralized as is illustrated in the equation $NaCl+HF+NH_3=NaF+NH_4Cl$ the reaction proceeds substantially to completion and good yields of both sodium fluoride and ammonium chlorid are obtained. A feature of the process therefore is the neutralization of the acid generated in the reaction. A further feature of the process is the treatment of the sodium salt with hydrofluoric acid and ammonia simultaneously. This feature is advantageous in that it avoids the storage of hydrofluoric acid by permitting it to be used directly as it is generated. It also permits the use of simple and inexpensive apparatus which need not be proof against either strong acid or alkali. This procedure also prevents the loss of ammonia or hydrofluoric acid by volatilization from the reaction mixture.

Further features of the invention will appear from the following description of the application of the process to the manufacture of sodium fluoride from sodium nitrate.

I prepare a solution of sodium nitrate and introduce into this solution hydrofluoric acid preferably in gaseous form and ammonia preferably in the form of gas liquor of the grade of powder makers' ammonia simultaneously or intermittently at a relative rate sufficient to maintain the reaction mixture practically neutral or slightly acid until hydrofluoric acid chemically equivalent to the sodium nitrate in the solution has been introduced. The reaction mixture is then neutralized by a further addition of ammonia after which the sodium fluoride is separated from the reaction mixture by cooling and crystallization and is washed and dried. The wash waters are conveniently used for dissolving a subsequent batch of sodium nitrate. The mother liquor contains principally ammonium nitrate with a small amount of sodium fluoride say from 3 to 6 per cent. The sodium fluoride is precipitated as artificial cryolite $Al_2F_6.6NaF$ and the ammonium nitrate simultaneously purified by addition to the mother liquor of aluminum fluoride in quantity sufficient to combine with the sodium fluoride in the proportions indicated by the formula. The precipitated artificial cryolite is separated and washed. The artificial cryolite is produced in relatively small amount but is a valuable by-product of the process and substantially off-sets the cost of the sodium fluoride production.

Ammonium nitrate is recovered from the purified mother liquor by concentration and crystallization in the well known manner.

The process is usually carried out at room temperature, say 60° F., but the reaction mixture is warmed somewhat by the heat of the reaction and is allowed to cool or is refrigerated if desired to facilitate the separation of the sodium fluoride by crystallization.

The process preferably is carried out in solutions of the maximum concentration which will hold the ammonium salt formed in solution in order to facilitate the separation of the sodium fluoride and the ammonium salt by crystallization and also to avoid the handling of unnecessarily large volumes of solutions.

The raw materials employed in the process are inexpensive, the process is simple, and the yields are excellent. It is also noteworthy that the products of the process are obtained in comparatively pure form.

I claim:

1. Process of making metal fluoride which comprises simultaneously adding hydrofluoric acid and ammonia to a solution of a salt of a metal which is more soluble than the fluoride of said metal at a relative rate sufficient to maintain the reaction mixture substantially neutral.

2. Process of making metal fluoride which comprises adding hydrofluoric acid gas and ammonical gas liquor to a solution of a salt of a metal which is more soluble than the fluoride of said metal at a relative rate sufficient to maintain the reaction mixture substantially neutral.

3. Process of making sodium fluoride which comprises adding to a solution of a sodium salt which is more soluble than sodium fluoride hydrofluoric acid and ammonia at a relative rate sufficient to maintain the reaction mixture substantially neutral.

4. Process of making sodium fluoride which comprises reacting upon sodium nitrate with hydrofluoric acid and neutralizing the acid generated by the reaction.

5. Process of making sodium fluoride as defined in claim 3 in which sodium nitrate is the sodium salt employed.

6. Process of making sodium fluoride and an ammonium salt and purifying the ammonium salt with the simultaneous production of artificial cryolite which comprises reacting upon a sodium salt which is more soluble than sodium fluoride with hydrofluoric acid in quantity chemically equivalent to the sodium salt, neutralizing the acid generated by the reaction with ammonia, separating sodium fluoride from the reaction mixture, adding aluminum fluoride to the resulting mother liquor, separating the artificial cryolite so formed from the reaction mixture, and recovering ammonium salt from the resulting separated solution.

7. Process of making sodium fluoride and ammonium nitrate and purifying the ammonium nitrate with the simultaneous formation of artificial cryolite which comprises, reacting upon sodium nitrate in aqueous solution with hydrofluoric acid gas and neutralizing the resulting nitric acid as it is formed by the addition of ammonical gas liquor to the reaction mixture, separating sodium fluoride from the reaction mixture, adding aluminum fluoride to the resulting mother liquor and separating the artificial cryolite so formed, and recovering ammonium nitrate from the residual liquor.

In testimony whereof I affix my signature.

HENRY HOWARD.